US009706102B1

United States Patent
McInerny

(10) Patent No.: US 9,706,102 B1
(45) Date of Patent: Jul. 11, 2017

(54) ENHANCED IMAGES ASSOCIATED WITH DISPLAY DEVICES

(71) Applicant: AMAZON TECHNOLOGIES, INC., Seattle, WA (US)

(72) Inventor: Michael James McInerny, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/971,333

(22) Filed: Dec. 16, 2015

(51) Int. Cl.
*H04N 5/232* (2006.01)
*G06K 9/62* (2006.01)
*G06T 1/00* (2006.01)
*G06T 7/00* (2017.01)
*G06K 9/46* (2006.01)
*H04N 5/262* (2006.01)
*H04N 5/265* (2006.01)
*H04N 5/76* (2006.01)

(52) U.S. Cl.
CPC ....... *H04N 5/23206* (2013.01); *G06K 9/4604* (2013.01); *G06K 9/6215* (2013.01); *G06T 1/0021* (2013.01); *G06T 7/0085* (2013.01); *H04N 5/23229* (2013.01); *H04N 5/265* (2013.01); *H04N 5/2628* (2013.01); *H04N 5/76* (2013.01); *G06T 2201/005* (2013.01); *G06T 2207/20112* (2013.01)

(58) Field of Classification Search
None
See application file for complete search history.

(56) References Cited

U.S. PATENT DOCUMENTS

| 8,842,085 | B1 * | 9/2014 | Goodspeed | G06F 17/21 345/173 |
| 9,460,346 | B2 * | 10/2016 | King | H04N 1/32101 |
| 2009/0180697 | A1 * | 7/2009 | Erol | G06F 17/30056 382/218 |

* cited by examiner

*Primary Examiner* — James Hannett
(74) *Attorney, Agent, or Firm* — Lindauer Law, PLLC

(57) ABSTRACT

A photograph acquired by a camera, such as a smartphone, may include at least a part of a display device, such as a television or computer monitor. The display device may present a displayed image on the display device at the time of the photograph. The camera may send a request that may be processed by a source device such the television or a desktop computer. Responsive to the request, a presented image may be provided that corresponds to the displayed image on the display device at the time of the photograph. The presented image may then be used instead of the photograph, may be stored in addition to the photograph, may be used to update a portion of the photograph, and so forth.

20 Claims, 9 Drawing Sheets

ENHANCED IMAGES ASSOCIATED WITH DISPLAY DEVICES

BACKGROUND

Various devices including standalone cameras, tablets, smartphones, and so forth may acquire images of a scene. Sometimes these images may include a display device, such as a television, that is displaying an image.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
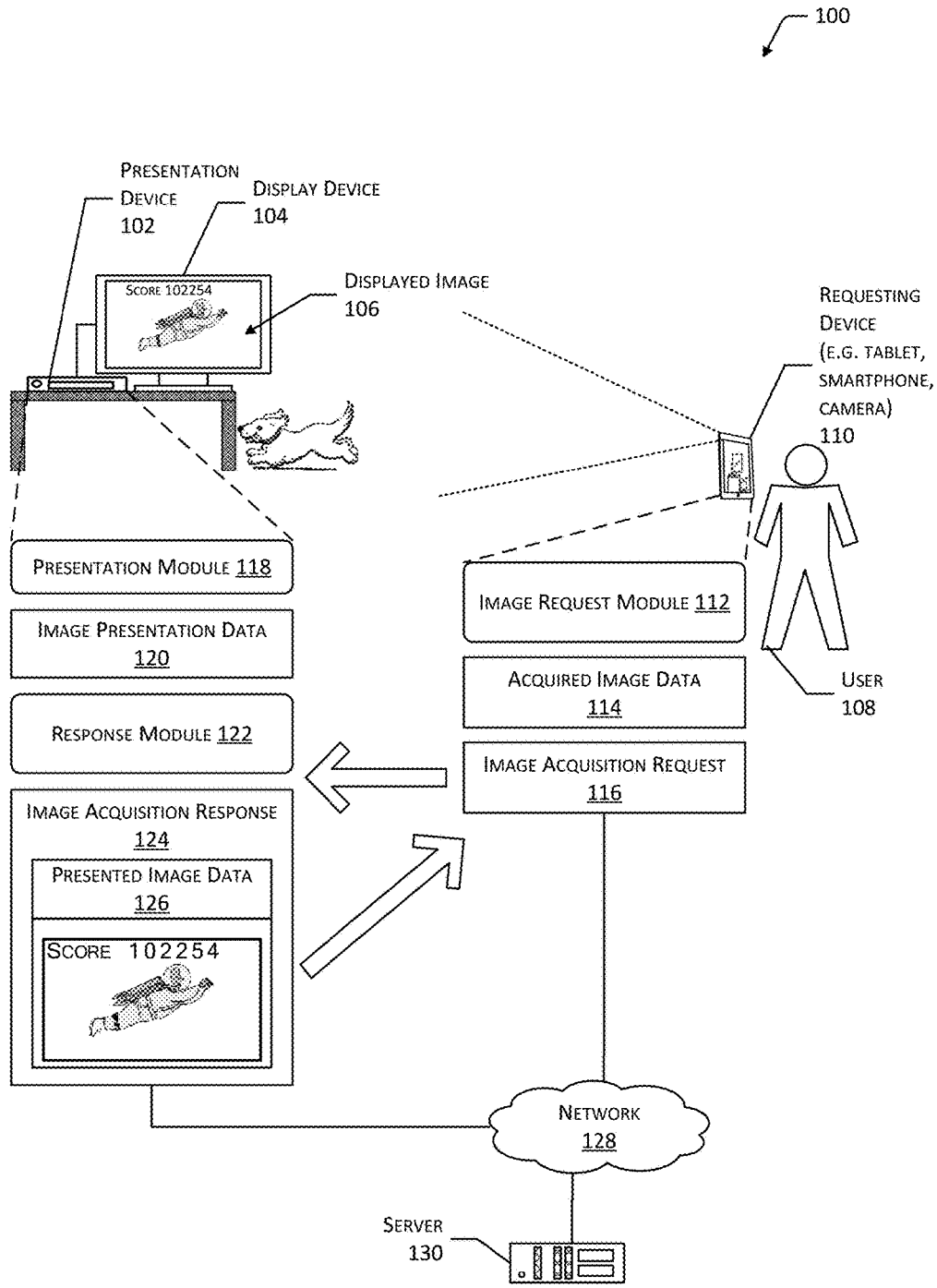
FIG. 1 is an illustrative system of a requesting device obtaining a presented image that is representative of the displayed image presented on a display device by a presentation device, according to one implementation.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Users may take pictures of many different scenes with many different devices. For example, the user may take pictures using a camera on a smart phone of their friend playing a videogame. The pictures may include a display device, such as a television screen or computer monitor. Traditionally, pictures that include a displayed image may suffer from various quality issues. For example, differences in the refresh rate the display device and the scan rate of the sensors in the camera may result in image artifacts such as banding. Additionally, the resolution of the acquired image from the camera may be less than that presented on the display device. In some situations, the user may be taking the picture the display device to capture the image on the display device and may not need or want the other elements of scene such as the background, television set, and so forth in the image. Continuing the earlier example, the user may be taking the picture of their friend's success at a particular point within the videogame.

Described in this disclosure are techniques in which a requesting device may generate an image acquisition request that is processed to generate an image acquisition response. The requesting device may comprise a smart phone, tablet, standalone camera, network enabled camera, and so forth. Upon receiving a command, such a request to acquire a picture resulting from the press of a button on the smart phone, the requesting device may generate image acquisition request. The image acquisition request may include information such as a time the request is made, location of the requesting device, acquired image data obtained from the camera the requesting device, and so forth. The image acquisition request may be sent to a presentation device. The presentation device may comprise a game console, set-top box, optical disc player, or other device that provides data suitable for presentation by an output device. For example, the presentation device may generate presentation images such as in the case of the game console, or may decrypt and provide presentation images from content stream from a server. The presentation device sends presentation images to a display device for subsequent presentation as displayed images. For example, the presentation device may comprise a game console that connects to a television using a High Definition Multimedia Interface (HDMI®). In some implementations, the presentation device and the display device may be combined into a single unit. For example, a "smart television" may include internally the components of the presentation device.

The presentation device may be configured to maintain image presentation data. For example, the image presentation data may comprise the presented image data stored in an image or frame buffer, with the image data retained after presentation for at least some time. In one implementation, a response module of the presentation device processes the image acquisition request that was sent by the requesting device. The response module then determines the presented image data that is associated with the image acquisition request. For example, the image acquisition request may include a particular acquisition timestamp indicating when the user triggers the shutter on the camera of the requesting device. The response module may determine the presented image data stored in the buffer that has a presentation timestamp closest in time to that of the acquisition timestamp. That presented image data may then be provided as part of the image acquisition response that is sent to the requesting device.

In some implementations, operation of the system may be based on the determination that the requesting device and the presentation device are proximate to one another. One or more of the requesting device, the presentation device, or a coordinating server may have information indicative of proximity of the other device or other devices that are present. For example, the presentation device may transmit a broadcast via a wireless network that indicates the ability to process image acquisition requests. The requesting device may receive the broadcast and provide this functionality to the user.

Proximity may be determined using various techniques. In one implementation proximity may be determined based on the ability for one device to receive signals from another device. For example, a handshake may occur between the presentation device and the requesting device using a local area network (LAN) or short range communication technology. In another implementation proximity may be determined based on use of common networking devices. For example, two devices may be deemed to be proximate when they share a network gateway having the same media access control (MAC) address. In yet another implementation, proximity may be determined based on geolocation data. For example, one or more of a global positioning system receiver or a cellular data network may provide latitude and longitude associated with a particular device. A comparison may be made between the latitude and longitude of two devices to determine if there within a threshold distance of one another, and thus deemed to be proximate to one another. In still another implementation proximity may be determined based on information associated with the devices. For example, the presentation device may be registered to a particular street address, while user account that is logged into the requesting device is also associated with the same street address, resulting in a determination that the two devices are proximate to one another. One or more of these different implementations may be combined to determine proximity.

Other techniques may be used by the response module to determine the particular presented image data to include in the image acquisition response, maintain digital rights associated with the content being presented by the display device, and so forth. In one implementation, the displayed image may be detected within the acquired image and compared against presented image data to determine a correspondence. For example, the correspondence may comprise similarity between the displayed image appearing in the acquired image and the presented image data. In another example, the correspondence may comprise a comparison of watermark data that is associated with the acquired image and the presented image.

The image acquisition response may include other information associated with the environment in which one or more of the presentation device or the display device resides. For example, the room in which the display device sits may have lighting capable of varying its color temperature responsive to computer control. As a result, the room lighting may have a particular hue. In some implementations, the image acquisition response may include a presented image data as well as information on the color temperature settings of that lighting to allow for a higher fidelity representation of the displayed image in that particularly colored light. In another example, the other information associated with the environment may be indicative of ambient light from outside, such as the weather being bright and sunny or overcast.

In some implementations instead of, or in addition to, presented image data, the image acquisition response may include other information such as application state data, model data, and so forth. For example, the application state data may indicate a particular hypertext transfer protocol (HTTP) address, document path and filename, position with content, and so forth. The application state data may then be used to re-create the application state on the requesting device or on another device. This may allow the user requesting the device to "pick up" at the point in the use of a particular application as depicted on the display device. The model data may comprise information such as two-dimensional or three-dimensional rendering information associated with the generation of computer generated imagery. The requesting device then uses this model data to generate different points of view, alter the presentation such as changing gamma correction levels, and so forth.

While the examples given herein describe the presentation and acquisition of images, the same techniques may be applied to content presented in other formats, such as audio presentations and recordings obtained using a microphone.

By using the techniques described in this disclosure, the user may be better able to memorialize information associated with presentation of content, may experience improved satisfaction as a result of better quality data for later access (such as higher resolution images of a display device), and so forth.

Illustrative System

FIG. 1 is an illustrative system 100 for providing enhanced images associated with display devices, according to one implementation. A presentation device 102 is connected to a display device 104. The presentation device 102 may comprise a game console, set-top box, optical disc player, personal computer, digital video recorder, tablets, e-book readers, wireless speaker and voice command device for audible interaction, or other device that provide data suitable for presentation by an output device such as the display device 104 to produce the displayed image 106. The presentation device 102 may connect to or be incorporated with other output devices (not shown), such as an audio system having one or more speakers. The display device 104 may comprise a computer monitor, television, a projector, and so forth. In some implementations, the presentation device 102 and the display device 104 may be combined into a single unit. For example, a "smart television" may include components to provide the same or similar functionality as a presentation device 102. In other implementations, some functionality may be distributed across devices. For example, the frame buffer of the display device 104 may be used to provide a presented image, instead of or in addition to a frame buffer of the presentation device 102.

A user 108 may have a requesting device 110. The requesting device 110 may comprise smart phone, tablet, standalone camera, network enabled camera, e-book reader, wireless speaker and voice command device for audible interaction, personal computer, and so forth. For example, the network enabled camera may comprise a security camera or other camera that is in the environment with the display device 104. The user 108 may comprise a human, or in some implementations may comprise an automated process set of instructions. For example, a human user such as a programmer may configure images to be acquired when certain conditions are met.

The requesting device 110 may execute at least in part an image request module 112. The image request module 112 is configured to accept input from the user 108 associated with acquiring an image. For example, the image request module 112 may receive input such as the user activating a button or control to activate the camera shutter function. The requesting device 110 may be configured to generate acquired image data 114. For example, a camera within or in communication with the requesting device 110 may be activated to generate the acquired image data 114. The acquired image data 114 may include a scene within which at least a portion of the display device 104 and the displayed image 106 are present. For example, the display device 104 may be at least partially within the field of view of the camera of the requesting device 110. In other implementations, other acquired data may be obtained, such as audio detected by a microphone of the requesting device 110.

The image request module 112 may be configured to generate an image acquisition request 116. For example, the image acquisition request 116 may be generated subsequent to the acquisition of the acquired image data 114. In some implementations, the user interface may be provided with which the user 108 may select a function that generates and sends the image acquisition request 116. For example, the user 108 may activate a control in a user interface to generate the image acquisition request 116. In other implementations, generation and transmission of the image acquisition request 116 may occur automatically. The image request module 112 may be configured to determine participating presentation devices 102 or other devices that are able to response to the image acquisition request 116. For example, the image request module 112 may send broadcast polling for participating devices. In another example, the image request module 112 may listen for announcements made by participating devices, such as the presentation device 102.

In some implementations, the image request module 112 may generate the image acquisition request 116 only when a display device 104 is depicted within the acquired image data 114. For example, the image request module 112 may process the acquired image data 114 to determine if the displayed image 106 is present. In other implementations, the image request module 112 may generate an image acquisition request 116 regardless of whether the display device 104 or portion thereof is within the field of view of the camera used to generate the acquired image data 114.

The image request module 112 may be configured to generate the image acquisition request 116 regardless of whether acquired image data 114 is obtained. For example, the requesting device 110 may comprise a device that does not include a camera and executes the image request module 112. The image request module 112 may generate an image acquisition request 116, such as upon receiving input from the user 108.

In other implementations, an acquisition request may be generated that is not associated with images. For example, the acquisition request may be associated with presentation of audible content.

The presentation device 102 may include a presentation module 118 used to present content. For example, the presentation module 118 may comprise a graphics system that accepts data from an application and produces output suitable for presentation on the display device 104. For example, the presentation module 118 may receive data from the gaming application, a web browser, a video presentation application, and so forth. In another implementation, the presentation module 118 may be configured to present audio output, documents, direct the motions of a robot or other remotely operated device, and so forth.

The content presented by the presentation module 118 may be previously generated. In one implementation, the content may be previously generated, such as a movie or television show obtained from a catalog or library of content. In another implementation, the content may be generated during operation of a device, such as the images produced by a game console or streaming game service.

The presentation module 118 may be configured to acquire, store, or otherwise maintain image presentation data 120. The image presentation data 120 comprises information associated with the information that is sent to the display device 104 for display. In some implementations, presentation data may be used that is associated with content that is not image based. For example, the presentation data for audible content may be indicative of the audio file. The presentation data, including image presentation data 120, may be archived or stored for extended periods of time, or may be stored only for a short time. For example, the image presentation data 120 may be retained by the presentation device 102 for ten minutes, and then is discarded. The image presentation data 120 is described in more detail below with regard to FIG. 2.

A response module 122 is configured to process image acquisition request 116 or other acquisition request received from the requesting device 110. After receiving an image acquisition request 116, the response module 122 may access the image presentation data 120 and generate an image acquisition response 124. The image acquisition response 124 may include presented image data 126. For example, the presented image data 126 may comprise a bitmap, JPEG, or other image that corresponds to the image acquisition request 116. Operation of the response module 122 is described in more detail below with regard to FIG. 3. The image acquisition response 124 may then be provided to the requesting device 110.

In some implementations, one or more of the presentation device 102, the display device 104, or the requesting device 110 may communicate using one or more networks 128. One or more networks 128 may comprise a wireless local area networks (WLANs), personal area networks (PANs), wireless wide area networks (WWANs), and so forth. For example, the presentation device 102 and the requesting device 110 may have network interfaces to communicate using Wi-Fi®, Bluetooth®, and so forth. One or more of the presentation device 102, the display device 104, or the requesting device 110 may use the network 128 to access one or more servers 130.

Some networks 128 and the associated communication technologies may be deemed "short" range, such as having a range of less than 50 meters and others may be "long" range, having a range of greater than 50 meters. For example, Bluetooth® may be deemed "short" range while a WWAN to connect to a cellular data network may be deemed "long" range". Such technologies include, but are not limited to, induction wireless, infrared wireless (such as technologies operating according to specifications and protocols provided by the Infrared Data Association, or IrDA) or ultra wideband formats. In some embodiments, the presentation device 102 and the requesting device 110 may utilize short-range, low-power and high-frequency radio transmissions, such as Bluetooth®. In still other embodiments, the presentation device 102 and the requesting device 110 may support acoustic-based data transfer. For example, the presentation device 102 may include software components and a speaker that enable the presentation device 102 to broadcast data to the requesting device 110 as sound waves, while the requesting device 110 may include software components and microphone that enable the requesting device 110 to receive the data embedded in the sound waves. Thus, one or more of radio signal-based data transfer (e.g., near field communication (NFC) or Bluetooth®), light-based data transfer (e.g., infrared data transfer), an acoustic-based data transfer (e.g., sound wave-embedded data), or magnetic field-based transfer (e.g., reading data from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein.

The one or more servers 130 may provide various functions to one or more of the presentation device 102, the requesting device 110, and so forth. For example, presentation device 102 may be configured to send at least a portion of the image presentation data 120 to a server 130 for storage. The server 130 may then be configured with the response module 122 to respond to the image acquisition request 116 made by requesting device 110.

In another example, the requesting device 110 may comprise a process executing on the server 130. The server 130 may be configured to store acquired image data 114 that have been provided by the requesting device 110. Upon receiving the acquired image data 114, the server 130 may generate an image acquisition request 116 and obtain the image acquisition response 124.

The one or more servers 130 may also be used to determine proximity between devices. For example, the server 130 may acquire information from the presentation device 102 and the request device 110 to determine if the two are deemed to be proximate to one another. Continuing the example, the information may include MAC addresses of a network gateway for each of the devices, geolocation data, information associate with particular user accounts, and so forth.

In some implementations, a server 130 may generate the image presentation data 120. For example, the server 130 may comprise an on demand gaming system that generates video associated with gameplay at the server 130. This video may then be streamed to the presentation device 102 via the network 128 for presentation on the display device 104 as the displayed image 106. In this implementation, the image acquisition request 116 may be processed by the server 130, using image presentation data 120 obtained at the server 130.

One or more of the functions associated with the presentation device 102 may be performed at least in part by one or more other devices such as the display device 104, the server 130, and so forth.

The requesting device 110 may provide to the presentation device 102 credentials or other information to permit access to an external device, such as the server 130. The credentials may comprise a digital certificate, token, and so forth. The server 130 may be used to store at least a portion of the image acquisition response 124. In some implementations the credentials may be limited to a single use, expire after a threshold number of uses, expire after a threshold amount of time, and so forth. The credentials may be specific to a particular requesting device 110, account associated with the user 108, geolocation, and so forth. In some implementations the credentials may be provided using a short range communication technology. For example, NFC or Bluetooth® may be used to send the credentials from the requesting device 110 to the presentation device 102. Use of this short range transmission may increase overall security of the system 100.

In some implementations a request may be sent by the requesting device 110 to the server 130 with information about the presentation device 102. The server 130 may then establish a secure connection with the presentation device 102 for the transfer of the image acquisition response 124.

Proximity between the requesting device 110 and the presentation device 102 may also be determined using direct communication between the two. In one implementation, signals sent by a short range communication technology such as NFC or Bluetooth® may be used to determine proximity. For example, a handshake may occur between the presentation device 102 and the requesting device 110 using the short range communication technology. In another example, each device may receive a transmission sent by the other device without establishing a connection. Continuing the example, the requesting device 110 may receive a transmission from the presentation device 102, the presentation device 102 may receive a transmission from the requesting device 110, or both. Proximity may be determined based on information of the reception from both devices, or from just one.

Figure 2:
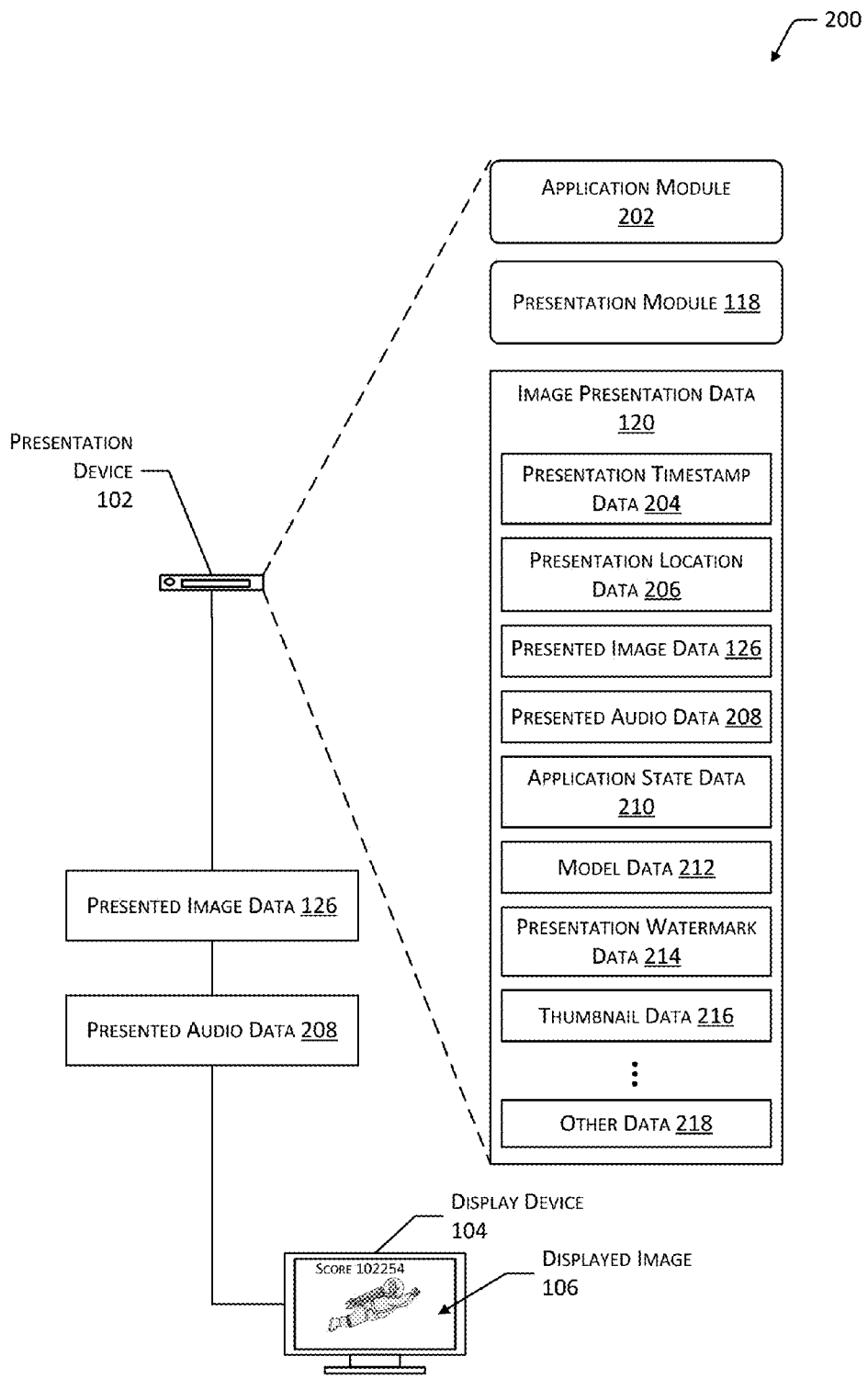
FIG. 2 illustrates a block diagram of some modules and data associated with operation of the presentation device, according to one implementation.

FIG. 2 illustrates a block diagram 200 of some modules and data associated with operation of the presentation device 102, according to one implementation. The presentation device 102 may execute at least a portion of an application module 202. For example, the application module 202 may comprise a content streaming application that receives video from the server 130 by way of the network 128. The application module 202 may pass data to the presentation module 118. For example, the application module 202 may decrypt the video received from the server 130 and pass the decrypted data onto the presentation module 118.

The presentation module 118 may generate the presented image data 126. Continuing the example above, the presentation module 118 may use the decrypted video to create a Motion Pictures Expert Group (MPEG) compliant stream of data that may be sent using an HDMI® connection to the display device 104. The presentation module 118 may comprise a rendering engine, such as the OGRE rendering image as promulgated by the OGRE Team as described at www.ogre3d.org. The presentation module 118 may comprise a game engine, such as the Blender Game Engine promulgated by the Blender Foundation as described at www.blender.org.

The presentation module 118 may be configured to generate the image presentation data 120. The image presentation data 120 may include one or more of the following pieces of data. The image presentation data 120 may include presentation timestamp data 204 may comprise information indicative of when the presented image data 126 was sent to the display device 104 for example, the presentation timestamp data 204 may indicate timestamp of when a particular frame of video data was sent using an HDMI® connection.

The image presentation data 120 may include presentation location data 206. The presentation location data 206 may provide information indicative of a location of the presentation device 102, the display device 104, or both at a time contemporaneous with sending the presented image data 126 to the display device 104. The location may be indicative of a particular absolute geolocation, such as specified by latitude and longitude. Location may be indicative of a particular relative location, such as "living room", or "kitchen".

The image presentation data 120 may include the presented image data 126. For example, the presented image data 126 in an image buffer that is supplying frames to the HDMI® may be retained for some time after transmission to the display device 104. In another example, the presented image data 126 may be stored in another data structure. In some implementations, the presented image data 126 may expire based on one or more of passage of time, receipt of an image acquisition request 116, departure of the requesting device 110 from proximity of the display device 104, and so forth. For example, the presented image data 126 that is more than five minutes old may be discarded.

The image presentation data 120 may include presented audio data 208. For example, the presented audio data 208 may comprise information that may be processed by an audio system to generate sound output using a speaker. Similar to the image presentation data 120, the presented audio data 208 may be retained for some time after transmission to the output device. Similarly, the presented audio data 208 may expire or be removed based on one or more passage of time, receipt of the image acquisition request 116, and so forth.

The image presentation data 120 may include application state data 210. The application state data 210 may include information associated with operation of the application module 202 at a particular time. For example, the application state data 210 may include information such as the particular HTTP address, document path and filename, position within content, user interface settings, and so forth. Over time, the application state data 210 associated with the application module 202 may change. For example, the application module 202 may present a first streamed content title at a first time and a second streamed content title at a second time. State information indicative of a first HTTP address associated with the first streamed content title may be stored as the application state data 210 for that time.

The image presentation data 120 may also include model data 212. The model data 212 may comprise information used during the generation of an image or other content. The model data 212 may comprise information that describes a two-dimensional or three-dimensional representation of a real or computer-generated object. For example, the model data 212 may comprise a file suitable for processing by the OGRE rendering image as promulgated by the OGRE Team as described at www.ogre3d.org. The model data 212 may include one or more values associated with generation of the content that is presented using a display device 104, such as scaling, orientation, virtual camera position data, and so forth. For example, the model data 212 may comprise information about an exhibit in a museum.

The image presentation data 120 may sometimes include presentation watermark data 214. The presentation watermark data 214 may include information that is embedded within one or more of the presented image data 126, the presented audio data 208, or other output that is presented by an output device using information received from the presentation device 102. Presence of the presentation watermark data 214 may be perceptible or imperceptible to an end user during presentation. For example, the presentation watermark data 214 may comprise a two-dimensional barcode that is presented every sixtieth frame.

In one implementation, the presentation device 102 may send first presented audio data 208 for presentation contemporaneously with first presented image data 126. The presentation device 102 may also send second presented audio data 208 for presentation contemporaneously with second presented image data 126. The presented audio data 208 may include acoustic watermarks that may be used to reference particular presented image data 126. The image acquisition request 116 received from the requesting device 110 may include acquired audio data, or a watermark value obtained from the acoustic watermark is received by the requesting device 110. A correspondence between the image acquisition request 116 and a portion of the content presented by the presentation device 102 may be based on the watermark value in the audio data.

In some implementations, the image presentation data 120 may include thumbnail data 216. For example, the thumbnail data 216 may comprise image data, audio data, and so forth that has a resolution less than that of an input. For example, the presented image data 126 may have image dimensions of 1920×1280 pixels with a 30 bit color depth per pixel, while the thumbnail data 216 may have image dimensions of 480×320 pixels with 8 bits per pixel of color depth.

The image presentation data 120 may include other data 218. In one implementation, the other data 218 may comprise information about the operation of other devices in the environment proximate to the display device 104 or otherwise associated with use of the presentation device 102 or the display device 104. For example, the room in which the display device 104 sits may have a lighting device capable of varying color temperature responsive to computer control. As a result, the room lighting may have a particular hue. The image presentation data 120 may include the information on the color temperature settings of that lighting device.

In another implementation, the other data 218 may be determined from external sources, may be based on information such as the presentation location data 206, and so forth. For example, based on the presentation location data 206 sunrise and sunset times, weather conditions, and so forth may be determined and included in the image presentation data 120. This other data 218 may allow for higher fidelity presentation of the presented image data 126 that more accurately represents that which was seen by the user 108 at that point in time on the display device 104. Continuing example, the presented image data 126 may be modified to produce an image that, when rendered on a display device 104, is consistent with the displayed image 106 as presented during overcast conditions occurring at the time of the presentation.

Figure 3:
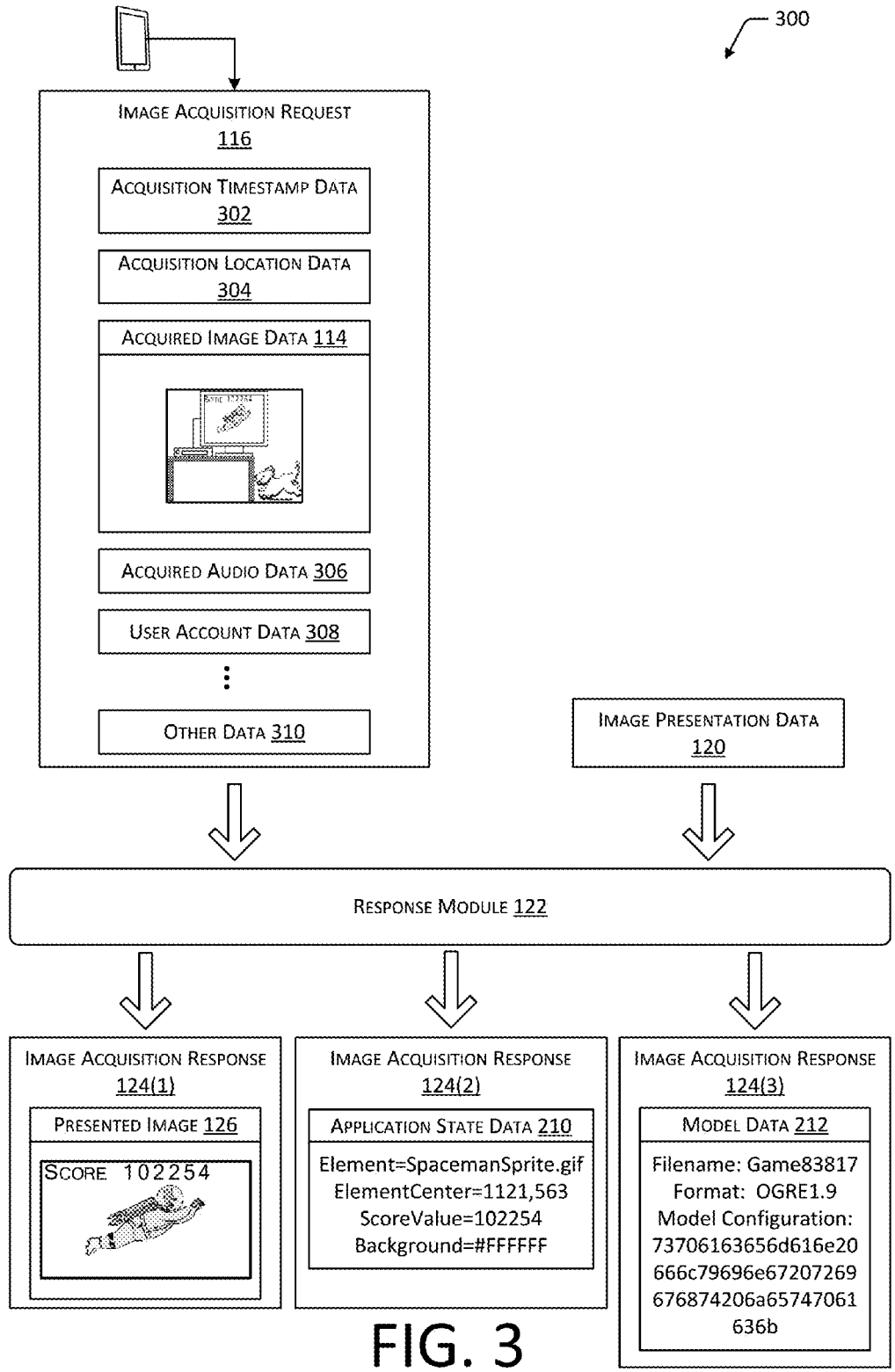
FIG. 3 illustrates a block diagram of an image acquisition request and the image acquisition response that may be generated by the response module, according to one implementation.

FIG. 3 illustrates a block diagram 300 of an image acquisition request 116 and the image acquisition response 124 that may be generated by the response module 122, according to one implementation.

The image acquisition request 116 may include one or more of the following data. The image acquisition request 116 may include acquisition timestamp data 302 that is indicative of a particular time. For example, the acquisition timestamp data 302 may be indicative of a clock time indicated by the requesting device 110 that corresponds to when the user 108 activated a shutter release control to generate acquired image data 114.

The image acquisition request 116 may include acquisition location data 304. Similar to the presentation location data 206, the acquisition location data 304 may provide information indicative of a location of the requesting device 110 at a particular time. As above, particular time may be when shutter release control is activated.

The image acquisition request 116 may include acquired image data 114. As described above, the acquired image data 114 may comprise image data obtained from a camera, or other imaging device. The acquired image data 114 may, in some situations, include at least a portion of the display device 104 and the displayed image 106 is presented on the display device 104.

The image acquisition request 116 may include acquired audio data 306. For example, the requesting device 110 may include a microphone that is used to generate audio data responsive to sound.

The image acquisition request 116 may include user account data 308. For example, the user account data 308 may provide information indicative of a particular user account associated with the user 108. The user account data 308 may comprise credentials, a token value, and so forth that are associated with one or more user accounts.

The image acquisition request 116 may include other data 310. The other data 310 may include the value of a watermark that is been recognized in the displayed image 106. The other data 310 may include a heading or direction along which the field of view of the camera is pointed, information about the location of the requesting device 110 relative to one or more output devices, a device identifier associated with the requesting device 110, and so forth. The other data 310 may include response preferences. For example, the response preferences may indicate that the requesting device 110 would like to receive one or more of presented image data 126, application state data 210, model data 212, or other information.

The response module 122 accepts as input the image presentation data 120 and the image acquisition request 116. The response module 122 is configured to determine a correspondence, if any, between the image presentation data 120 and the image acquisition request 116. The correspondence may between one or more of the data in the image acquisition request 116 and one or more of the data in the image presentation data 120.

In one implementation, the response module 122 may determine a similarity metric indicative of a similarity between the acquired image data 114 and the presented image data 126. For example, a first histogram may be generated from the acquired image data 114 and a second histogram may be generated from the presented image data 126 using the calcHist( ) function of OpenCV as promulgated at www.opencv.org. The compareHist( ) function of OpenCV may then be used to compare the histograms and determine similarity. In other implementations, other techniques may be used to determine similarity metrics. For example, maximally stable extremal regions (MSER), scale-invariant feature transform (SIFT), speeded up robust features (SURF), and other techniques may be used to generate data descriptive of a particular image. The data descriptive of the particular image may then be compared to data from other images to determine similarity. If the similarity metric exceeds a threshold value, the acquired image data 114 and the presented image data 126 may be deemed to represent the same image.

In another implementation, the response module 122 may determine watermark data encoded as a watermark within the acquired image data 114. The watermark data obtained from the acquired image data 114 may then be compared with the presentation watermark data 214. If a match is determined between the two, then the acquired image data 114 may be deemed to correspond to the particular presented image data 126 that is associated with that value of watermark data.

In some implementations, instead of, or in addition to a watermark within the presented image data 126, acoustic watermarks may be used. For example, the acquired audio data 306 may be processed to determine an acoustic watermarks value, the may be then compared to the presentation watermark data 214.

In some implementations, a value of the watermark may be determined by the requesting device 110 and then provided in the image acquisition request 116 instead of, or in addition to, the acquired image data 114. The response module 122 may then use the value of the acquired watermark to determine corresponding presentation watermark data 214 and the resulting presented image data 126 associated there with.

In yet another implementation, the response module 122 may determine correspondence based at least in part on timestamp data. For example, acquisition timestamp data 302 provided in the image acquisition request 116 may be compared with presentation timestamp data 204. If the two timestamps are within a threshold value of one another, the particular presented image data 126 associated with that timestamp may be determined to correspond with the presented image data 126. In some implementations, the presentation device 102 and the requesting device 110 may exchange time synchronization data by way of the network 128.

In other implementations, other techniques may be used to determine a correspondence between the image acquisition request 116 and the image presentation data 120.

The response module 122 may be configured to be responsive to information that authenticates or otherwise affirms the presence of the requesting device 110 proximate to the display device 104. For example, the watermark comparison described above may be used to authenticate that the requesting device 110 has likely obtained an image associated with a particular displayed image 106. In some implementations, the location data may be used to determine the requesting device 110 is proximate to the display device 104. For example, the response module 122 may compare the acquisition location data 304 with the presentation location data 206 to determine if the two are within a threshold distance of one another. In some implementations, the response module 122 may be configured to deny the image acquisition request 116 if the requesting device 110 is not proximate to the display device 104.

Once the correspondences have been determined between the image acquisition request 116 and the image presentation data 120, the response module 122 may generate an image acquisition response 124. As described above, the image acquisition response 124 may include a variety of different data. For example, the image acquisition response 124(1) includes the presented image 126 that was sent to the display device 104 at the particular time corresponding to that indicated by the acquisition timestamp data 302. The requesting device 110 may then view or otherwise use the presented image data 126.

In another example, the image acquisition response 124(2) comprises the application state data 210. In this example, the application state data 210 indicates that for the game application particular elements that are presented on the display, the relative location, score value, background color, and so forth. The requesting device 110 may then provide the application state data 210 to an application module 202 in order to generate every production of the presented image data 126.

In yet another example, the image acquisition response 124(3) may include the model data 212. In this example, the model data 212 comprises a file compatible with the OGRE rendering engine. The requesting device 110 may then use the model data 212 to regenerate the presented image data 126. With the model data 212, the requesting device 110 may be able to generate renderings from different points of view, alter lighting conditions, and so forth.

In some implementations, such as where content presented on the display device 104 is being streamed from a server 130, the image acquisition response 124 may include other information associated with that streaming. The response module 122 may determine a user account associated with the content sent for presentation. For example, the response module 122 may request information indicative of the credentials used by the application module 202 to obtain the content. The response module 122 may also determine a service associated with providing the content. For example, the response module 122 may request information indicative of the server 130 as being accessed by the application 202 to obtain content. The image acquisition response 124 within comprise the data indicative of the user account, the service, and the particular portion of the content that is been deemed to be associated with the image acquisition request 116. The image acquisition request 116 may then be provided to the requesting device 110. In some implementations, data such as the user account or other credentials may be limited to a requesting device 110 is associated with the same user account.

The response module 122 or another module may be configured to generate composite images or otherwise combine the acquired image data 114 and the presented image data 126. For example, the picture of the scene provided by the requesting device 110 may be modified such that pixels depicting the display device 104 in that picture are replaced with pixels from the presented image data 126. The resulting composite image may have elements that are representative different resolutions. For example, the presented image data 126 as inserted into the composite image may have a higher resolution than the remainder of the composite image.

In some implementations the image acquisition response 124 may be indicative of, presented from, or otherwise based on the point of view of the requesting device 110 relative to one or more output devices such as the display device 104. For example, the image acquisition response 124 may have a rendering of the presented image data 126 that is consistent with the apparent perspective of the user 108 holding the requesting device 110.

The image acquisition response 124 may include other information as well, or may be associated with other rights. For example, an image acquisition request 116 generated at a concert by a ticket holder may be processed, with the authorization of the performing artist, to allow access to an official copy of the audio from that particular concert to the user 108.

The recipient of the image acquisition response 124 may use that information recreate or recapture the state of a particular time and place at a later time or place. In one implementation, the image acquisition response 124(3) including model data 212 may be used to generate a virtual reality representation of the time and location associated with the image acquisition request 116.

In another implementation, the user 108 may generate an image acquisition request 116 of a booth at a tradeshow. The image acquisition response 124 may include information about the particular product being demonstrated at that time, promotional material about that product, images obtained from cameras associated with the booth, and so forth.

Figure 4:
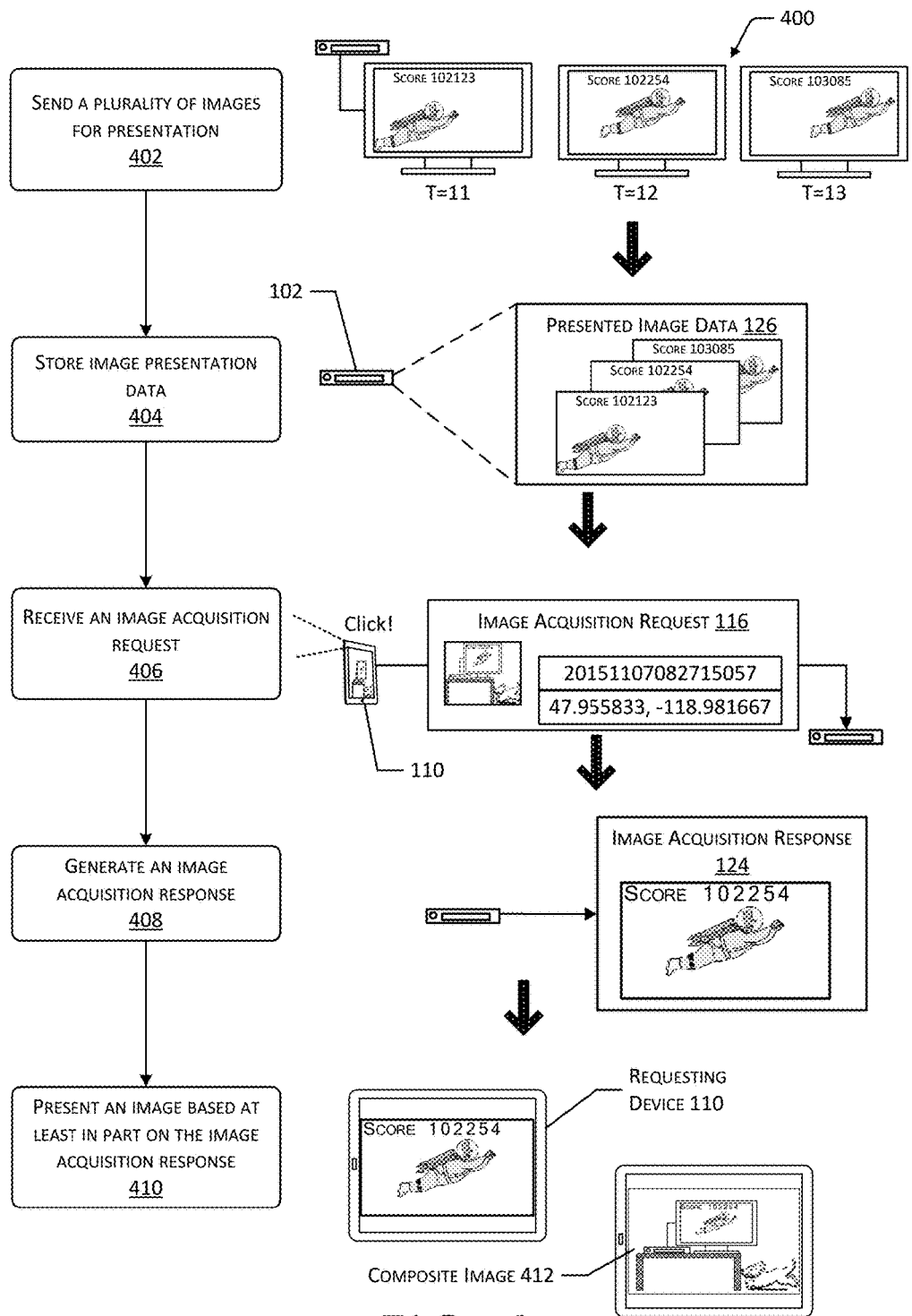
FIG. 4 illustrates a flow diagram of a process by which a requesting device presents an enhanced image based at least in part on the image acquisition response, according to one implementation.

FIG. 4 illustrates a flow diagram 400 of a process by which a requesting device 110 presents an enhanced image based at least in part on the image acquisition response 116, according to one implementation.

At 402 a plurality of images are sent for presentation. For example, the presentation device 102 may send presentation image data 126 comprising images t=11 through t=13 to the display device 104 using a Wi-Fi® direct or Zigbee® connection.

At 404 image presentation data 120 is stored by the presentation device 102. Continuing the example, the presented image data 126 may include the various images that were sent to the display device 104 and for that have been stored within an image buffer.

At 406 an image acquisition request 116 is requested. The image acquisition request 116 may be generated responsive to input from the user 108. For example, the user 108 may activate a control or button to take a picture using a camera on the requesting device 110. The image acquisition request 116 may include acquired image data 114, acquisition timestamp data 302, and acquisition location data 304.

The image acquisition request 116 may be generated by an external device that is other than the presentation device 102, the display device 104, and so forth. For example, a network accessible audio device having one or more microphones may receive an audio signal that is used to trigger generation of the image acquisition request 116. In another example, a camera may obtain an image of the user 108 and determine a particular gesture or facial expression is being made. Responsive to the gesture or facial expression, the image acquisition request 116 may be generated. In yet another example, accelerometer data from the requesting device 110 may be used to trigger an image acquisition request 116 when motion exceeding a threshold value is detected.

At 408 the presentation device 102 generates an image acquisition response 124. For example, the response module 122 may determine that the requesting device 110 and the presentation device 102 proximate to one another based on the geolocation data, and may determine the particular presented image data 126 based on a comparison of the timestamp data as described above. In some implementations, the geolocation data may be used to determine the particular presentation device 102. For example, the requesting device 110 may generate acquired image data 114 that does not include the display device 104, or which is too blurry or otherwise unusable. Based on the acquisition location data 304, the image presentation data 124 that particular geolocation may be obtained and used. As described above, in some implementations the image acquisition response 124 may include the presented image data 126, application state data 210, the model data 212, or other information associated with the presentation.

At 410 an image based at least in part on the image acquisition response 124 may be presented. For example, the requesting device 110 may display the presented image data 126. In another example depicted, the image may comprise a composite image 412. The presented image data 126 may be inserted into or composited with the acquired image data 114 to produce a composite image 412. For example, the response module 122 may determine a boundary of the display screen of the display device 104 as depicted in the acquired image data 114. For example, an object recognition algorithm may look for the particular aspect ratio associated with the display device 104, bending patterns typical of displayed image 106, codes embedded within the displayed image 106, and so forth. A perspective transform may be determined based on the boundary of the display screen. For example, the perspective transform may comprise information such as a transformation matrix that relates associates points on a plane if the display screen in the acquired image data 114 to a plane that is orthogonal to a viewer. The perspective transform may then be applied to the first image to generate an intermediate image. For example, the intermediate image may comprise the presented image data 126 that has been skewed to have the same apparent size and orientation as the displayed image 106 as it appears within the acquired image data 114. The composite image 412 may be generated by inserting the intermediate image into the acquired image, in place of the display screen.

Figure 5:
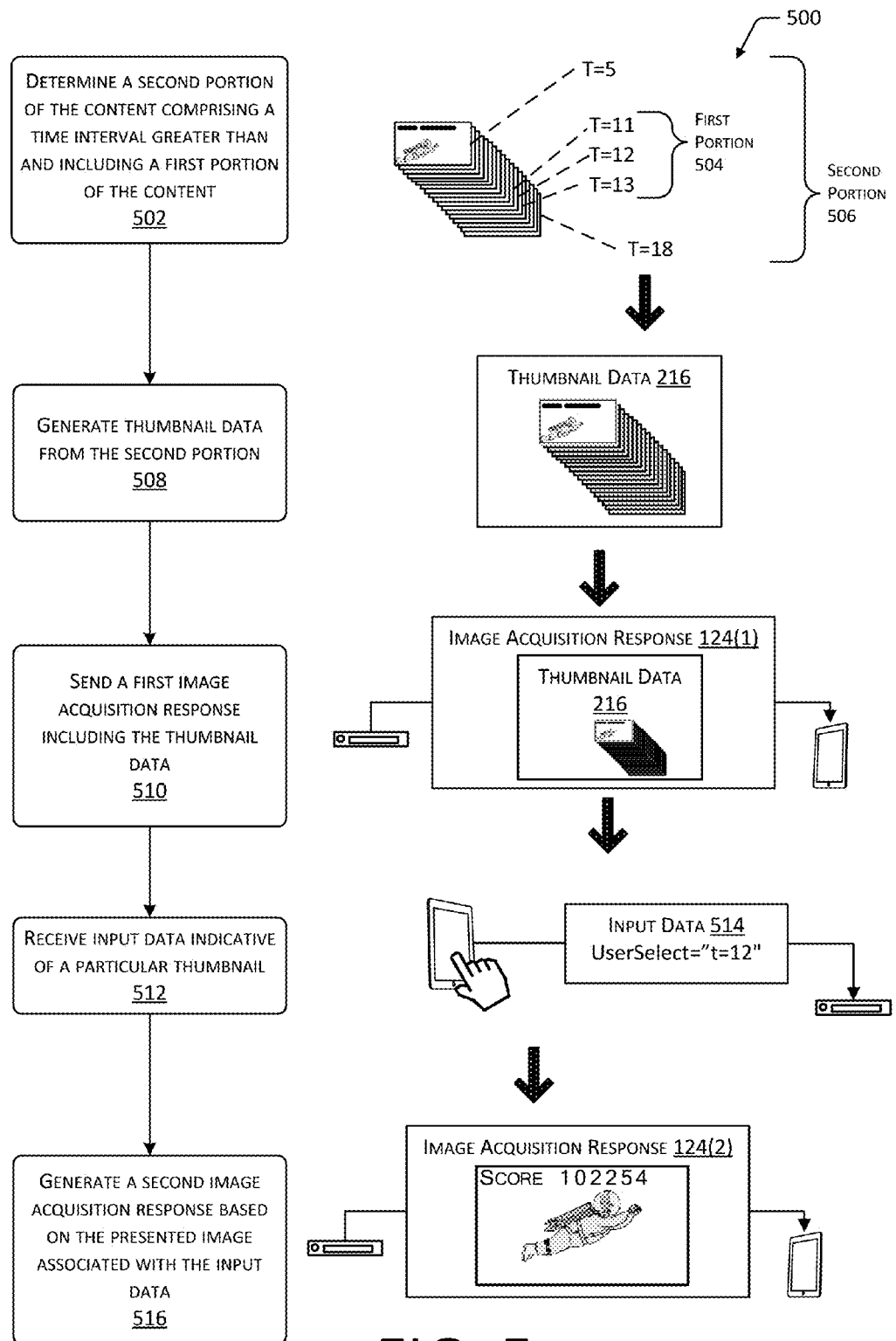
FIG. 5 illustrates a flow diagram of a process by which a particular presented image may be selected, according to one implementation.

FIG. 5 illustrates a flow diagram 500 of a process by which a particular presented image may be selected, according to one implementation. In some situations, the user 108 may be delayed in initiating the image acquisition request 116, may wish to retroactively create an image acquisition request 116, and so forth. The user 108 may select an option to use the process described below or the process may be used automatically.

At 502 the response module 122 may determine a second portion of the content comprising a time interval greater than and including the first portion of the content. For example, the first portion 504 may comprise one or more frames that have presentation timestamp data 204 that is within the threshold value of the acquisition timestamp data 302. A second portion 506 comprises additional frames occurring before and after the first portion 504. For example, the second portion 506 may include a time interval that is greater than and including the first portion 504. The first portion 504 may be a subset of the second portion 506.

At 508 thumbnail data 216 is generated from the second portion 506. For example, the response module 122, the presentation module 118, or another module may generate the reduced resolution thumbnail data 216 of the presented image data 126 within the second portion 506.

At 510 a first image acquisition response 124 that includes the thumbnail data 216 is sent to the requesting device 110.

At 512 the response module 122 receives input data 514 indicative of a particular image in the thumbnail data 216 from the requesting device 110. For example, the user 108 may scroll through or otherwise navigate through the sheaf of thumbnails in the thumbnail data 216 to select the thumbnail corresponding to the presented image data 126 at t=12. The user 108 may thus be able to navigate to image presentation data 120 associated with times before or after the time associated with the image acquisition request 116.

At 516 a second image acquisition response 124 is generated based on the presented image associated with the input data 514. Continuing the example above, the second image acquisition response 124 may comprise the full resolution presented image data 126 associated with time t=12.

Figure 6:
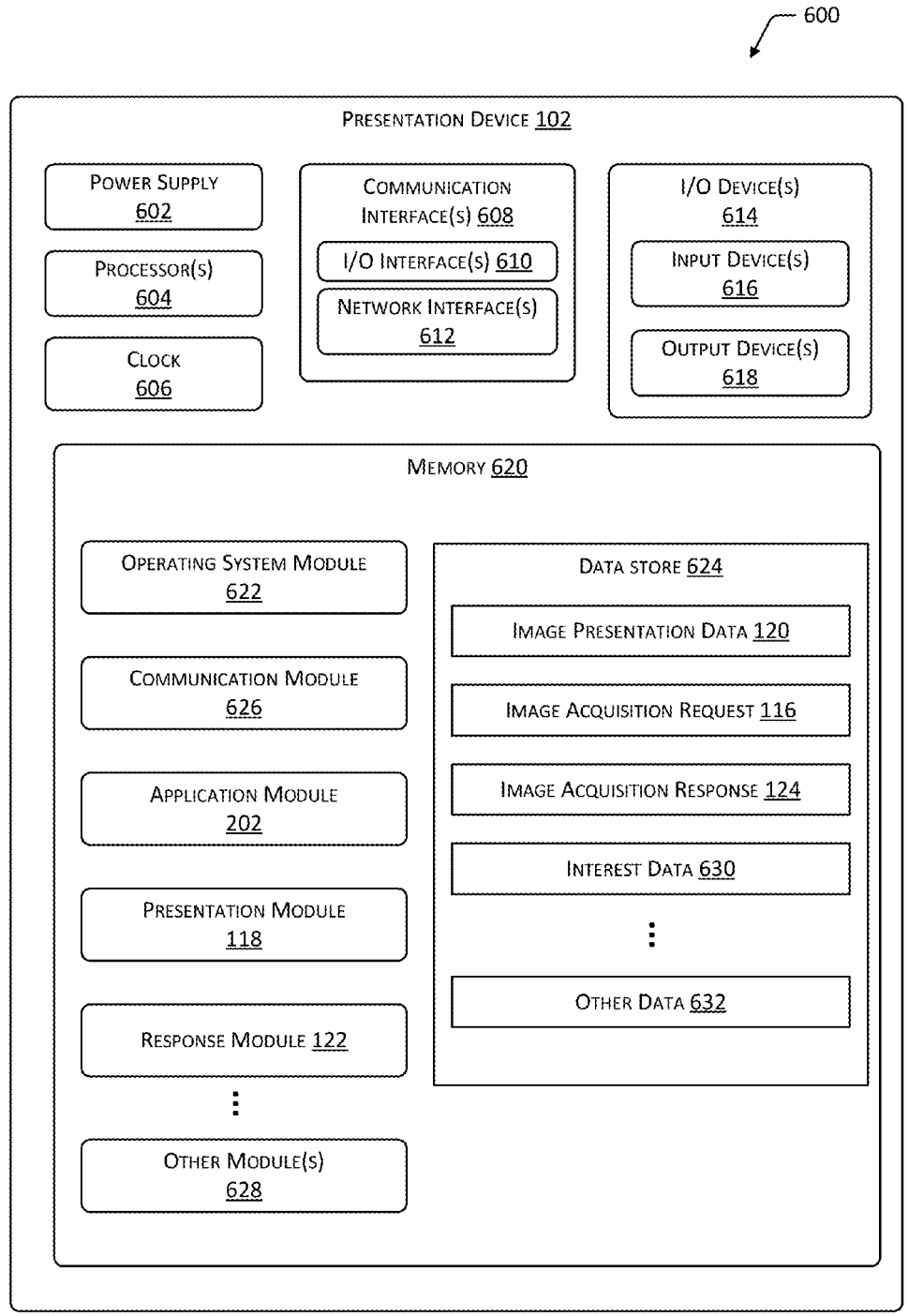
FIG. 6 illustrates a block diagram of the presentation device, according to one implementation.

FIG. 6 illustrates a block diagram 600 of the presentation device 102, according to one implementation. One or more power supplies 602 are configured to provide electrical power suitable for operating the components in the presentation device 102. In some implementations, the power supply 602 may include a single use battery, a rechargeable battery, a fuel cell, a photovoltaic cell, a wireless power receiver, a thermoelectric generator, and so forth.

The presentation device 102 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to generate a timestamp, trigger a preprogrammed action, and so forth. In some implementations, one or more of the components described with regard to the presentation device 102 may be implemented by one or more of an application specific integrated circuit (ASIC), system-on-a-chip (SOC), a microcontroller, and so forth.

The presentation device 102 may include one or more communication interfaces 608 such as I/O interfaces 610, network interfaces 612, and so forth. The communication interfaces 608 enable the presentation device 102, or components thereof, to communicate with other devices or components. The communication interfaces 608 may include one or more I/O interfaces 610. The I/O interfaces 610 may comprise interfaces such as Inter-Integrated Circuit (I2C), Serial Peripheral Interface bus (SPI), Universal Serial Bus (USB), RS-232 interface, and so forth.

The I/O interface(s) 610 may couple to one or more I/O devices 614. The I/O devices 614 may include input devices 616 such as one or more touch sensors, buttons, proximity sensors, switches, and so forth. The I/O devices 614 may also include output devices 618. For example, the output devices 618 may include one or more of a light emitting diode display, a liquid crystal display, an electrophoretic display, coaster display, a speaker, a haptic output device, and so forth. In some embodiments, the I/O devices 614 may be physically incorporated with the presentation device 102 or may be externally placed.

The network interface(s) 612 are configured to provide communications between the presentation device 102 and other devices, such as routers, access points, other user devices 104, and so forth. The network interfaces 612 may include devices configured to couple to personal area networks (PANs), local area networks (LANs), wide area networks (WANs), and so forth. The network interface 612 may comprise one or more components such as radio receivers, radio transmitters, and so forth to provide for connectivity with a wireless network. The network interface 612 may include devices compatible with Wi-Fi®, Bluetooth®, ZigBee®, 2G, 4G, LTE, and so forth.

The presentation device 102 may also include one or more busses or other internal communications hardware or software that allow for the transfer of data between the various modules and components of the presentation device 102.

As shown in FIG. 6, the presentation device 102 includes one or more memories 620. The memory 620 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the presentation device 102. A few example functional modules are shown stored in the memory 620, although the same functionality may alternatively be implemented in hardware, firmware, or as a SOC.

The memory 620 may include at least one operating system OS module 622. The OS module 622 is configured to manage hardware resource devices such as the I/O interfaces 610, the network interface 612, the I/O devices 614, and provide various services to applications or modules executing on the processors 604. The OS module 622 may implement a variant of the FreeBSD™ operating system as promulgated by the FreeBSD Project, other UNIX™ or UNIX-like variants, a variation of the Linux™ operating system as promulgated by Linus Torvalds, the Windows® operating system from Microsoft Corporation of Redmond, Wash., or other operating system.

Also stored in the memory 620 may be a data store 624 and one or more of a communication module 626, the application module 202, the presentation module 118, or other modules 628. These modules may be executed as foreground applications, background tasks, daemons, and so forth. The data store 624 may use a flat file, database, linked list, tree, executable code, script, or other data structure to store information. In some implementations, the data store 624 or a portion of the data store 624 may be distributed across one or more other devices including the computing devices, network attached storage devices, and so forth.

The communication module 626 may be configured to establish connections with one or more of the requesting device 110, the server 130, or other devices. The communications may be authenticated, encrypted, and so forth.

The application module 202 performs one or more functions. For example, the application module 202 may comprise a web browser, email client, game, content streaming application, and so forth.

The presentation module 118, as described above, may generate the presented image data 126 that is sent to the display device 104.

The response module 122 as described above may respond to the image acquisition request 116 by providing an image acquisition response 124. In some implementations, the response module 122 may be configured to generate interest data 630. For example, the interest data 630 may comprise information indicative of count of the number of image acquisition requests 116 associated with particular presented image data 126. For example, the interest data 630 may indicate that images are most frequently acquired at a certain point in gameplay.

In some implementations, the interest data 630 may be generated at least in part by the server 130. For example, the server 130 may receive interest data 630 from a plurality of presentation devices 102, and generate overall or aggregate interest data 630.

One or more of the image presentation data 120, the image acquisition request 116, the image acquisition response 124, the interest data 630, or other data 632 may be stored within the data store 624. For example, the other data 632 may include configuration settings for the application module 202, user preferences indicative of the type of image acquisition response 124 desired, and so forth.

Figure 7:
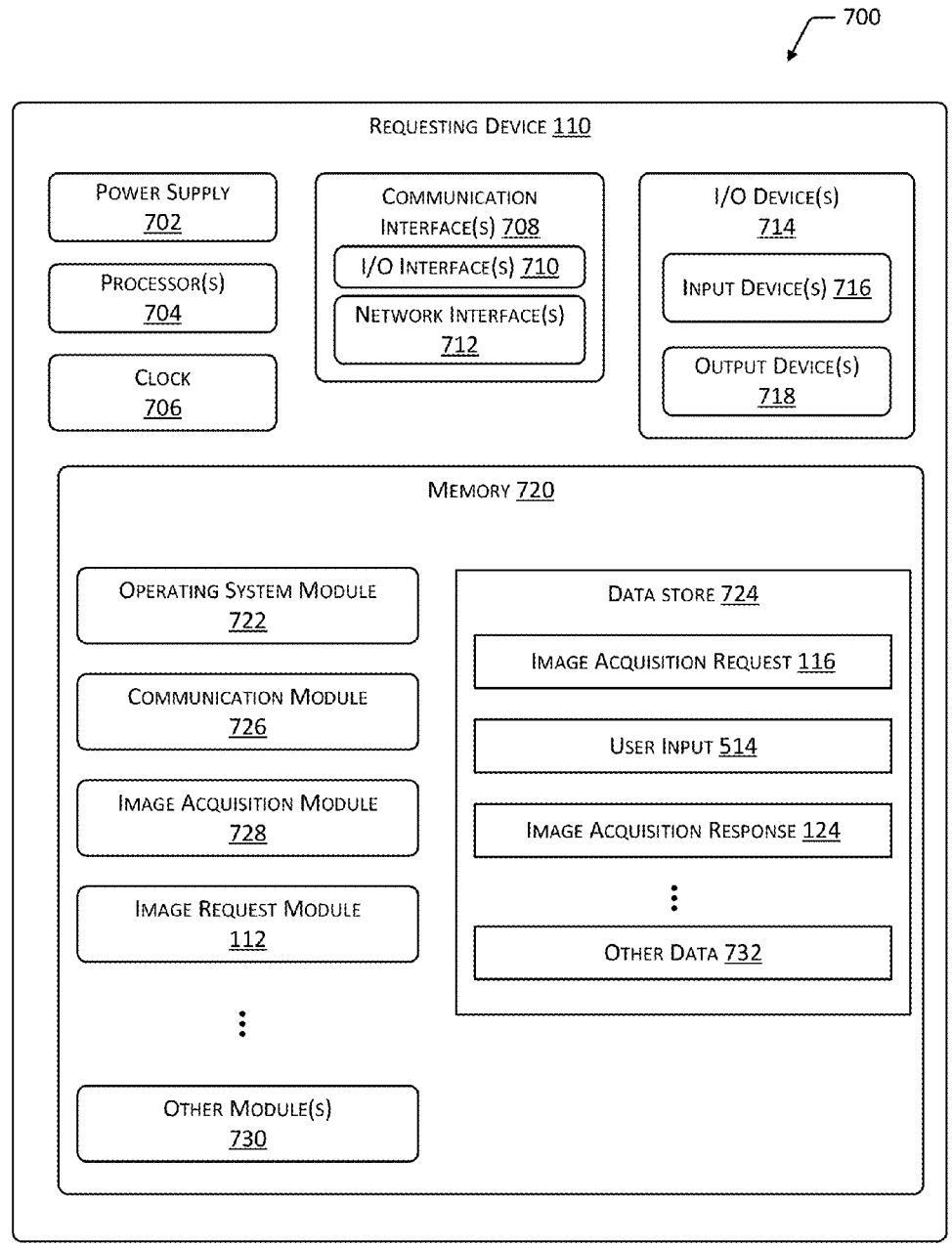
FIG. 7 illustrates a block diagram of the requesting device, according to one implementation.

FIG. 7 illustrates a block diagram 700 of the requesting device 110, according to one implementation. One or more power supplies 702 are configured to provide electrical power suitable for operating the components in the requesting device 110. In some implementations, the power supply 702 may include a single use battery, a rechargeable battery, a fuel cell, a photovoltaic cell, a wireless power receiver, a thermoelectric generator, and so forth.

The requesting device 110 may include one or more hardware processors 704 (processors) configured to execute one or more stored instructions. The processors 704 may comprise one or more cores. One or more clocks 706 may provide information indicative of date, time, ticks, and so forth. For example, the processor 704 may use data from the clock 706 to generate a timestamp, trigger a preprogrammed action, and so forth. In some implementations, one or more of the components described with regard to the requesting device 110 may be implemented by one or more of an ASIC, SOC, a microcontroller, and so forth.

The requesting device 110 may include one or more communication interfaces 708 such as I/O interfaces 710, network interfaces 712, and so forth. The communication interfaces 708 enable the requesting device 110, or components thereof, to communicate with other devices or components. The communication interfaces 708 may include one or more I/O interfaces 710. The I/O interfaces 710 may comprise interfaces such as I2C, SPI, USB, RS-232 interface, and so forth.

The I/O interface(s) 710 may couple to one or more I/O devices 714. The I/O devices 714 may include input devices 716 such as one or more touch sensors, buttons, proximity sensors, switches, and so forth. The I/O devices 714 may also include output devices 718. For example, the output devices 718 may include one or more of a light emitting diode display, a liquid crystal display, an electrophoretic display, coaster display, a speaker, a haptic output device, and so forth. In some embodiments, the I/O devices 714 may be physically incorporated with the requesting device 110 or may be externally placed.

The network interface(s) 712 are configured to provide communications between the requesting device 110 and other devices, such as routers, access points, other user devices 104, and so forth. The network interfaces 712 may include devices configured to couple to PANs, LANs, WANs, and so forth. The network interface 712 may comprise one or more components such as radio receivers, radio transmitters, and so forth to provide for connectivity with a wireless network. The network interface 712 may include devices compatible with Wi-Fi®, Bluetooth®, ZigBee®, 2G, 4G, LTE, and so forth.

The requesting device 110 may also include one or more busses or other internal communications hardware or software that allow for the transfer of data between the various modules and components of the requesting device 110.

As shown in FIG. 7, the requesting device 110 includes one or more memories 720. The memory 720 comprises one or more non-transitory CRSM. The memory 720 provides storage of computer-readable instructions, data structures, program modules, and other data for the operation of the requesting device 110. A few example functional modules are shown stored in the memory 720, although the same functionality may alternatively be implemented in hardware, firmware, or as a SOC.

The memory 720 may include at least one OS module 722. The OS module 722 is configured to manage hardware resource devices such as the I/O interfaces 710, the network interface 712, the I/O devices 714, and provide various services to applications or modules executing on the processors 704. The OS module 722 may implement a variant of the FreeBSD™ operating system as promulgated by the FreeBSD Project, other UNIX™ or UNIX-like variants, a variation of the Linux™ operating system as promulgated by Linus Torvalds, the Windows® operating system from Microsoft Corporation of Redmond, Wash., or other operating system.

Also stored in the memory 720 may be a data store 724 and one or more of a communication module 726, an image acquisition module 728, the image request module 112, or other modules 730. These modules may be executed as foreground applications, background tasks, daemons, and so forth. The data store 724 may use a flat file, database, linked list, tree, executable code, script, or other data structure to store information. In some implementations, the data store 724 or a portion of the data store 724 may be distributed across one or more other devices including the computing devices, network attached storage devices, and so forth.

The communication module 726 may be configured to establish connections with one or more of the presentation device 102, the server 130, or other devices. The communications may be authenticated, encrypted, and so forth.

The image acquisition module 728 may be configured to generate the acquired image data 114 based on input from one or more input devices 716. For example, the image acquisition module 728 may receive user input such as a shutter release signal associated with activation of a shutter release button. Responsive to the shutter release signal, the image acquisition module 728 may activate and read out data obtained from an imaging sensor. For example, the imaging sensor may comprise a complementary metal oxide semiconductor (CMOS), charge coupled device (CCD), and so forth. In some implementations, activation of the image acquisition module 728 results in a call to the image request module 112 to generate the image acquisition request 116.

As described above, the image request module 112 may be configured to generate the image acquisition request 116. For example, the image request module 112 may access the acquired image data 114 that was obtained following operation of the image acquisition module 728. The image request module 112 may also be used to process the user input data 514 and provide it to the response module 122. The response module 122 may, based at least in part on the user input data 514, generate an additional image acquisition response 124.

In some implementations, the image request module 112 may generate the image acquisition request 116 responsive to data obtained by one or more of the input devices 716. For example, the input devices 716 may include one or more of accelerometers or gyroscopes. When data obtained by these input devices 716 exceeds a threshold value, the image acquisition request 116 may be generated. Continuing the example, when the user 108 starts jumping up and down or otherwise rapidly moving their smart phone that is acting as a requesting device 110, the image acquisition request 116 may be generated.

The data store 724 may also be used to store one or more of the image acquisition request 116, the user input data 514, the image acquisition response 124, or other data 732. For example, the other data 732 may include configuration settings for the image acquisition module 728, user preferences indicative of the type of image acquisition response 124 desired, and so forth.

Figure 8:
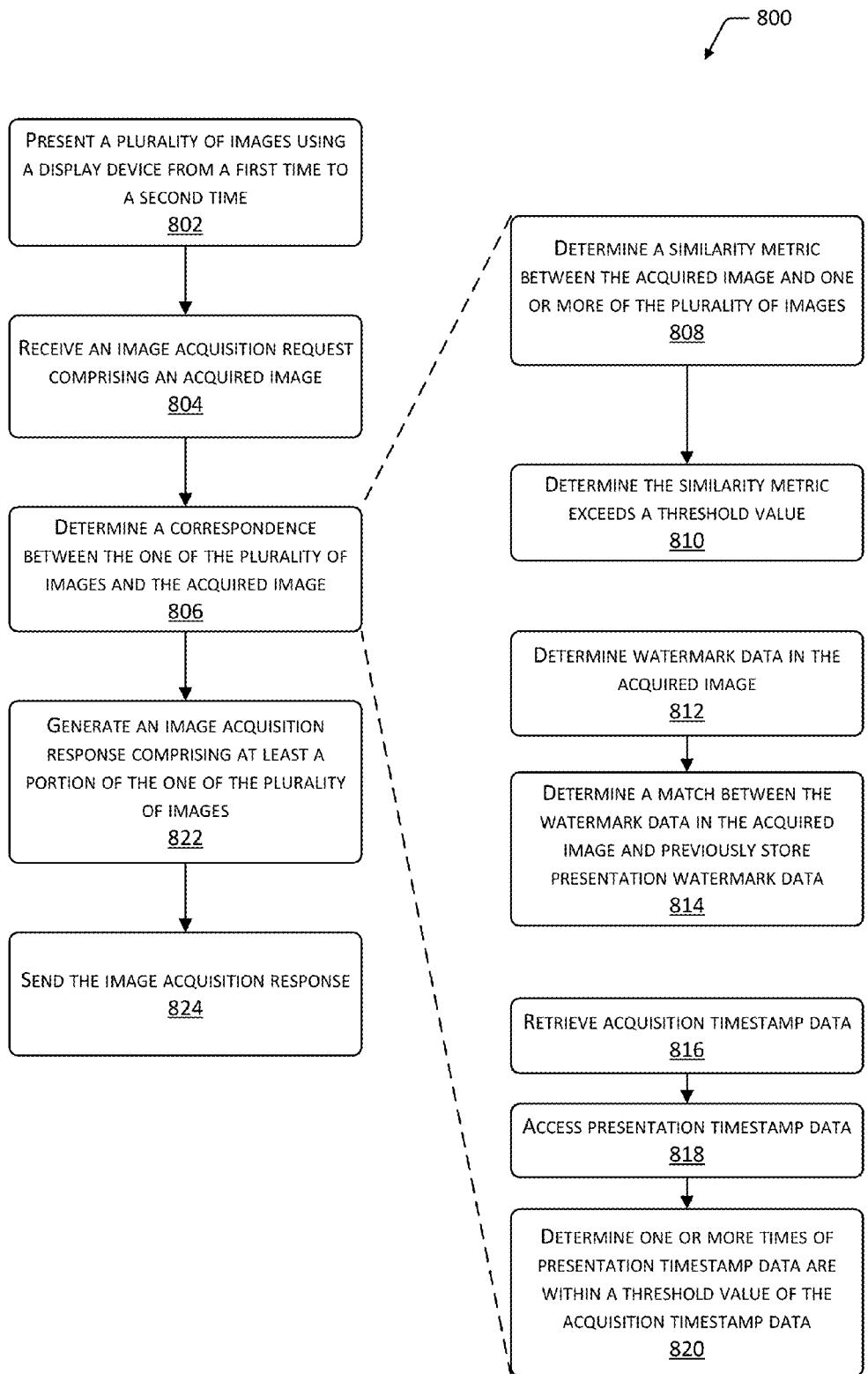
FIG. 8 illustrates a flow diagram of a process to send an image acquisition response, according to one implementation.

FIG. 8 illustrates a flow diagram 800 of a process to send an image acquisition response, according to one implementation. The process may be performed at least in part by one or more of the presentation device 102, the display device 104, the requesting device 110, or the server 130.

At 802 a plurality of images are presented using a display device 104 from a first time to a second time. For example, the plurality of images may comprise the presented image data 126 that were sent by the presentation device 102 to the display device 104. The display device 104 may then use the presented image data 126 to generate the displayed image 106.

At 804 an image acquisition request 116 is received from a requesting device 110, such as a camera. For example, a wireless network interface 612 may be used to receive the image acquisition request 116 from the requesting device 110. As described above, the image acquisition request 116 may comprise acquired image data 114. The acquired image data 114 may depict at least a portion of the display device 104 as obtained between the first time and the second time.

At 806 a correspondence between the one or more of the plurality of images in the acquired image data 114 is determined. In some implementations, the determination the correspondence may involve determination of proximity between the requesting device 110 and the display device 104. Image acquisition requests 116 received from requesting device 110 that are not proximate to the display device 104 may be disregarded, or may involve returning an image acquisition response 124 that includes metadata but omitting the presented image data 126, the model data 212, and so forth.

Proximity may be determined using one or more techniques. A first technique involves requesting proximity data from a server 130. For example, the server 130 may maintain a list of devices that are known or deemed to be proximate to one another. A second technique may determine the display device 104 and the requesting device 110 are on a local area network. For example, the MAC address of a gateway for each of the devices may be compared. If the MAC addresses are identical, the two devices may be deemed proximate to one another. A third technique involves detecting, at the requesting device 110, a signal sent by the display device 104. For example, the signal may be sent as part of the displayed image 106, as part of audio output by speakers of the display device 104, and so forth. In another example, the signal may comprise a radio frequency signal, and infrared signal, and so forth. The fourth technique involves detecting, at the display device 104, a signal sent by the requesting device 110. For example, the display device 104 may include a camera, microphones, infrared detector, or radio, to detect a signal transmitted by the requesting device 110. A fifth technique involves comparing a first geolocation of the display device 104 with a second geolocation of the requesting device 110. For example, the presentation location data 206 may be compared to the acquisition location data 304.

One or more of the following techniques may be used individual or in combination to determine a correspondence. It is understood that other techniques may be used to determine the correspondence as well.

Blocks 808 through 810 describe a first technique for determining correspondence between the image acquisition request 116 in the image acquisition response 124. At 808 a similarity metric indicative of similarity between one of the plurality of images and the acquired image data 114 is determined. For example, as described above histograms may be generated and used to compare the different images. In other implementations, other attributes of the images may be determined such as local descriptors which may then be compared to determine similarity. In some implementations, the similarity may only be for a portion of the acquired image data 114. For example, a portion of the acquired image data 114 that includes the display device 104 may be compared with the presented image data 126.

At 810 the similarity metric is determined to exceed a threshold value. For example, a system administrator may set the threshold value. In another implementation, the presented image data 126 having the greatest similarity value as compared to the acquired image data 114 may be selected for use in the image acquisition response 124.

Blocks 812 and 814 describe a second technique for determining correspondence between the image acquisition request 116 in the image acquisition response 124. At 812, as described above, watermark data encoded as a watermark within the acquired image data 114 may be determined. At 814 a match may be determined between the watermark data within the acquired image data 114 and the previously stored presentation watermark data 214. The particular presentation watermark data 214 may be indicative of a particular image of the presented image data 126. As described above, acoustic watermarks may also be used to determine a correspondence between acquired image data 114 and the presented image data 126.

Blocks 816-820 describe a third technique for determining correspondence between the image acquisition request 116 and the image acquisition response 124. At 816, acquisition timestamp data 302 is obtained from the image acquisition request 116. For example, the acquisition timestamp data 302 may be indicative of a time obtained from a clock 706 of the requesting device 110. At 818 presentation timestamp data 204 is accessed. As described above, the presentation timestamp data 204 may be indicative of one or more times associated with presentation of the presented image data 126. At 820, one of the one or more times of presentation timestamp data 204 are determined that are within a threshold value of the acquisition timestamp data 302.

At 822 an image acquisition response 124 is generated that comprises at least a portion of the one of the plurality of images associated with the time. For example, presented image data 126 associated with the acquired image data 114 may be included in the image acquisition response 124.

In some implementations, the image acquisition response 124 may include information obtained from other devices that are proximate to the display device 104. A first device may be determined to be proximate to the display device 104. For example, the first device may comprise a home automation control that is been registered to a particular street address. The acquisition location data 304 may be used to look for other devices, such as the first device, that are at the same street address. Devices may be deemed to be proximate when they are also associated with the same user account. For example, several different users 108 may share an apartment, but have different devices in their respective rooms. State data may be obtained from the first device, or other devices that are deemed to be proximate to the display device 104. Continuing the example above, the home automation controls may be accessed to determine ambient light settings, such as intensity and color temperature in the room that the display device 104 is located. The image acquisition response 124 may include this state data or other information.

At 824 the image acquisition response 124 is sent to the requesting device 110. For example, the wireless network may be used to send the image acquisition request 124 to the camera.

Figure 9:
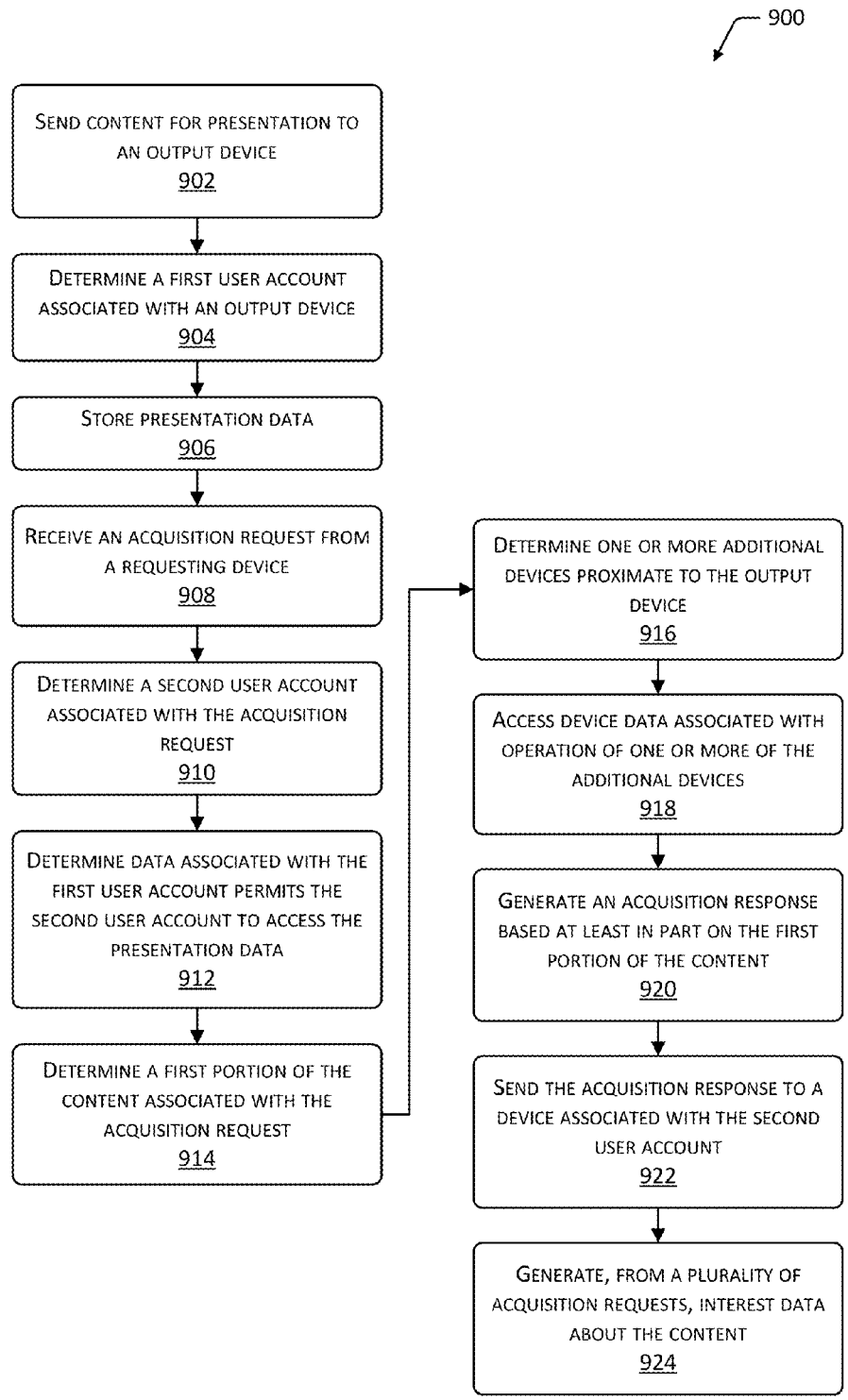
FIG. 9 illustrates a flow diagram of another process to send an image acquisition response, according to one implementation.

FIG. 9 illustrates a flow diagram 900 of another process to send an image acquisition response, according to one implementation. The process may be performed at least in part by one or more of the presentation device 102, the display device 104, the requesting device 110, or the server 130.

At 902, content is sent for presentation to an output device. For example, the content may comprise video data that is sent to a display device 104 for presentation. The video may include images and audio that is configured for synchronized presentation. In other implementations the content may comprise other output, such as audio for presentation using a speaker.

At 904 the first user account associated with the output device may be determined. For example, a first user account associated with the presentation device 102 or the display device 104 may be identified.

At 906 presentation, such as image presentation data 120 or other presentation data, associated with the content is stored. For example, the frames from the video data may be stored or retained in an image buffer after transmission to the display device 104. In implementations where the content is non-image based, or includes non-image based aspects, presentation data indicative of the presentation may be stored. For example, the content may comprise a document, audio data, or other file.

At 908 an acquisition request is received. For example, the acquisition request may include an image acquisition request 116 or other acquisition request indicative of non-image based content. For example, the user 108 may activate a control on the requesting device 110 to capture the current state of presentation. Responsive to the activation of this control, the acquisition request may be generated and sent to the presentation device 102. The particular requesting device 110 may include a device identifier of the requesting device 110 in the acquisition request.

At 910 a second user account associated with the acquisition request may be determined. For example, the user account of the user 108 associated with the requesting device 110 may be identified.

At 912 data associated with the first user account that permits the second user account to access the presentation data may be determined. For example, the first user account and the second user account may be determined to refer to the same user 108. In another example, the user 108 of the first user account may have granted access to the second user account. Continuing the example, a first user 108(1) associated with the user account be visited by a second user 108(2) associated with second user account. The second user 108(2) may have brought along a smart phone which access the requesting device 110. Until the first user 108(1) grants access, image acquisition request 116 generated by the requesting device 110 of the second user 108(2) may be disregarded. Once access has been granted, the acquisition response may be sent to the requesting device 110 associated with the second user account.

In some implementations, the acquisition response or portion thereof may be sent to another device. For example, instead of or in addition to sending to the requesting device 110, the acquisition response may be sent to a server 130 that is used to store images acquired by the user 108.

At 914 a first portion of the content 504 associated with the acquisition request is determined.

At 916 an additional device proximate to the output device may be determined. For example, proximity data may be analyzed to determine home automation devices that are proximate to the display device 104.

At 918, device data associated with operation of the additional device may be accessed. For example, the response module 122 may receive data broadcast by an additional device, may interrogate the additional device for device data, and so forth.

At 920 an acquisition response is generated based at least in part on the first portion 504 of the content. The acquisition response may include information based at least in part on the device data. For example, the acquisition data includes information about the color temperature and level of illumination in the room where the display device 104 is located.

In some implementations, the acquisition response may include data indicative of a storage location of the document, data indicative of a particular portion of the document, information about the file, and so forth. For example, the data indicative of a storage location may comprise a network address, file path, hyperlink, page number being presented, and so forth.

As described above, in some implementations the generation of the acquisition response may be responsive to a determination the requesting device 110 is proximate to the output device.

At 922 the acquisition response is sent to a device associated with the second user account.

At 924 interest data 630 may be generated. The interest data 630 may be generated from a plurality of image acquisition requests 116. As described above, the interest data 630 may provide information about the content that is indicative of the image acquisition requests 116 for the first portion 504 of the content.

The process of generating an acquisition request and receiving an acquisition response may be performed with or without image data. For example, the acquisition request may be triggered by an input of the user 108 using a requesting device 110 with no camera. Likewise, the acquisition response may include non-image data, such as data indicative of a storage location of the document and data indicative of a particular portion within that document.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a network interface;
a memory storing computer-executable instructions; and
a processor to execute the computer executable instructions to cause a presentation device to:
   present a plurality of images using a display device from a first time to a second time;
   receive, using the network interface, an image acquisition request from a camera device comprising an acquired image depicting at least a portion of the display device presenting one of the plurality of images as obtained between the first time and the second time;
   determine a time associated with the image acquisition request;
   determine one of the plurality of images associated with the time;
   determine a correspondence between the one of the plurality of images and the acquired image;
   generate an image acquisition response comprising a composite image including the at least one of the plurality of images determined to correspond to the acquired image and the portion of the display device from the acquired image; and
   send the image acquisition response to the camera device.

2. The system of claim 1, the instructions to determine the correspondence further comprise computer-executable instructions to:
determine a similarity metric indicative of similarity between the one of the plurality of images and the acquired image; and
determine the similarity metric exceeds a threshold value.

3. The system of claim 1, the instructions to determine the correspondence further comprise computer-executable instructions to:
determine watermark data encoded as a watermark within the acquired image; and
determine a match between the watermark data within the acquired image and previously stored presentation watermark data indicative of one or more of the plurality of images.

4. The system of claim 1, the instructions to determine the time associated with the image acquisition request further comprise computer-executable instructions to:
retrieve acquisition timestamp data from the image acquisition request, wherein the acquisition timestamp data comprises a time obtained from a clock of the camera device;
access presentation timestamp data indicative of one or more times associated with presentation of the plurality of images; and
determine one of the one or more times of presentation timestamp data are within a threshold value of the acquisition timestamp data.

5. A method of obtaining an image presented on a display device, the method comprising:
sending, from a presentation device, a first image and a second image to a display device for presentation of the first image and the second image using the display device;
storing, at the presentation device, image presentation data associated with the first image and the second image;
receiving, at the presentation device, an image acquisition request from an external device comprising an acquired image depicting at least a portion of the display device presenting the first image and the second image;
determining the first image is associated with the image acquisition request; and
generating an image acquisition response comprising a composite image of at least a portion of the first image and the portion of the display device from the acquired image.

6. The method of claim 5, wherein the image presentation data comprises the first image and the second image stored in an image buffer.

7. The method of claim 5, wherein the image presentation data comprises first state information indicative of a first application state associated with generation of the first image and second state information indicative of a second application state indicative of a second application state associated with generation of the second image.

8. The method of claim 5, further comprising:
sending first audio data for presentation contemporaneously the first image;
sending second audio data for presentation contemporaneously with the second image;
wherein the image acquisition request includes acquired audio data; and
the determining the first image is associated with the image acquisition request comprises determining presence of at least a portion of the first audio data in the acquired audio data.

9. The method of claim 5, further comprising:
wherein the external device comprises a camera; and
wherein the generating the image acquisition response comprises:
determining a boundary of a display screen of the display device as depicted in the acquired image;
determining a perspective transform based on the boundary of the display screen;
applying the perspective transform to the first image to generate an intermediate image; and
generating the composite image by inserting the intermediate image into the acquired image in place of the display screen.

10. The method of claim 5, further comprising:
sending a third image for presentation using the display device;
determining the second image is associated with the image acquisition request; and
wherein the image acquisition response further comprising the second image.

11. The method of claim 5, further comprising:
determining the external device is proximate to the display device;
receiving state data from the external device; and
wherein the image acquisition response includes at least a portion of the state data.

12. The method of claim 5, further comprising:
determining the external device initiated the image acquisition request and is proximate to the display device, the determining comprising one or more of:
requesting proximity data from a server,
determining the display device and the external device are on a common local area network,
detecting, at the external device, a signal sent by the display device,
detecting, at the display device, a signal sent by the external device, or
comparing a first geolocation of the display device with a second geolocation of the external device.

13. A system comprising:
a memory storing computer-executable instructions; and
a processor to execute the computer executable instructions to:
send content for presentation at a display device using an output device;
store presentation data associated with the content;
receive, at the output device, an acquisition request generated by a requesting device separate from the output device, the acquisition request comprises an acquired image depicting at least a portion of the display device presenting the content;
determine a first portion of the content associated with the acquisition request; and
generate an acquisition response based at least in part on the first portion of the content, the acquisition response comprising a composite image of the at least a portion of the display device and the first portion of the content.

14. The system of claim 13, wherein the content comprises a document and wherein the acquisition response comprises data indicative of a storage location of the document and data indicative of a particular portion of the document.

15. The system of claim 13, the instructions further comprising computer-executable instructions to:
determine model data comprising one or more values associated with generation of the content as presented using at least the output device; and
wherein the acquisition response comprises the model data.

16. The system of claim 13, the instructions further comprising computer-executable instructions to:
determine a first user account associated with the output device;
determine a second user account associated with the acquisition request from the requesting device;
determine data associated with the first user account permits the second user account to access the presentation data; and
send the acquisition response to the requesting device associated with the second user account.

17. The system of claim 13, the instructions further comprising computer-executable instructions to:
generate, from a plurality of acquisition requests, interest data about the content that is indicative of the acquisition requests for the content.

18. The system of claim 13, the instructions further comprising computer-executable instructions to:
determine the requesting device is proximate to the output device;
determine an additional device is proximate to the output device;
access device data associated with operation of the additional device; and
wherein the acquisition response includes information based at least in part on the device data.

19. The system of claim 13, the instructions further comprising computer-executable instructions to:
determine a second portion of the content comprising a time interval greater than and including the first portion of the content;
generate reduced resolution data from the second portion, wherein the second portion is at a first resolution and the reduced resolution data is at a second resolution less than the first; and wherein the acquisition response comprises the reduced resolution data.

20. The system of claim 13, the instructions further comprising computer-executable instructions to:
- determine a user account associated with the content sent for presentation;
- determine a service associated with providing the content; and
- wherein the acquisition response comprises data indicative of the user account, the service, and the first portion of the content.

\* \* \* \* \*